United States Patent [19]
Hill et al.

[11] Patent Number: 5,745,893
[45] Date of Patent: Apr. 28, 1998

[54] PROCESS AND SYSTEM FOR ARRANGEMENT OF DOCUMENTS

[75] Inventors: Joe R. Hill, Austin; Gregory J. Thompson, Round Rock, both of Tex.

[73] Assignee: Electronic Data Systems Corporation, Plano, Tex.

[21] Appl. No.: 565,806

[22] Filed: Nov. 30, 1995

[51] Int. Cl.$^6$ .................................................. G06F 17/30
[52] U.S. Cl. ........................ 707/5; 707/3; 707/6; 707/7
[58] Field of Search .................................. 395/605, 606; 364/300, 401; 707/5, 6, 7, 3

[56] References Cited

U.S. PATENT DOCUMENTS

| | | | |
|---|---|---|---|
| 4,719,571 | 1/1988 | Ressanen et al. | 364/300 |
| 5,140,692 | 8/1992 | Morita | 395/600 |
| 5,162,992 | 11/1992 | Williams | 364/419 |
| 5,168,565 | 12/1992 | Morita | 395/600 |
| 5,201,047 | 4/1993 | Maki et al. | 395/605 |
| 5,297,042 | 3/1994 | Morita | 364/419.19 |
| 5,301,109 | 4/1994 | Landauer et al. | 734/291 |
| 5,317,507 | 5/1994 | Gallant | 364/419.13 |
| 5,325,298 | 6/1994 | Gallant et al. | 364/419.19 |
| 5,418,946 | 5/1995 | Mori | 395/605 |
| 5,463,773 | 10/1995 | Sakakibara et al. | 395/605 |
| 5,508,912 | 4/1996 | Schneiderman | 464/401 |
| 5,519,865 | 5/1996 | Kondo et al. | 395/605 |

OTHER PUBLICATIONS

Hill, Joe R. and Tsai, Chih-Ling, Calculating the Efficiency of Maximum Quasilikelihood Estimation, Appl. Stat. vol. 37, No. 2, 1988.

van Rijsbergen, C.J., Information Retrieval, Depart. of Computer Science, University College, Dublin, 1975.

Fuhr, Norbert and Chris Buckley, A Probabilistic Learning Approach for Document Indexing, ACM Transactions on Information Systems, vol. 9, No. 3, Jul. 1991, pp. 223–248.

Turtle, Howard and W. Bruce Croft, Evaluation of an Inference Network–Based REtrieval Model, ACM Transactions on Information Systems, vol. 9, No. 3, Jul. 1991, pp. 187–222.

*Primary Examiner*—Thomas G. Black
*Assistant Examiner*—Frantz Coby
*Attorney, Agent, or Firm*—Anthony E. Peterman; L. Joy Griebenow

[57] ABSTRACT

According to one embodiment of the present invention, a system (10) for arrangement of documents (13) is provided. The system includes a document repository (12) storing a plurality of documents (13). An arrangement engine (14) is coupled to the document repository (12). The arrangement engine (14) is operable to build a plurality of symmetric matrices based upon a plurality of identified arrangements of the plurality of documents (13) in the document repository (12). Each matrix is structured such that each row and each column is associated with a document (13). The arrangement engine (14) is also operable: to fill each cell of each symmetric matrix with a relevance value representing a relevance between a document (13) associated with the row of the cell and a document (13) associated with the column of the cell, to generate a fitness value for each matrix based upon a magnitude and a position of each relevance value by analyzing each symmetric matrix using a fitness function (16), to identify an optimal arrangement of the plurality of documents (13) based upon the fitness value of each matrix, and to provide the optimal arrangement of documents (18) as system output.

15 Claims, 11 Drawing Sheets

| Patent No. | Title |
|---|---|
| 03652980 | Method and apparatus for seismic signal pattern discrimination |
| 04203161 | Method of enhancing common depth point seismic data |
| 04456926 | Enhancement of fluroscopically generated images |
| 04458267 | Digital x-ray system |
| 04528688 | Continuous speech recognition method |
| 04559604 | Pattern recognition method |
| 04573035 | Digital x-ray system |
| 04598369 | Tomography apparatus and method |
| 04633399 | Method of seismic data enhancement using a phrase of rectified trace seismic parameter |
| 04648044 | Basic expert system tool |
| 04727562 | Measurement of scatter in x-ray imaging |
| 04730351 | X-ray diagnostics installation |
| 04752957 | Apparatus and method for recognizing unknown patterns |
| 04813061 | X-ray diagnosis method and apparatus |
| 04829487 | Method for restoring seismic data using cross-correlation |
| 04860265 | Seismic trace restoration using F-K filtering |
| 04866634 | Data-driven, functional expert system shell |
| 04866635 | Domain independent shell for building a diagnostic expert system |
| 04884248 | Method of restoring seismic data |
| 04891766 | Editor for expert system |
| 04897811 | N-dimensional coulomb neural network which provides cumulative learning |
| 04897878 | Noise compensation in speech recognition apparatus |
| 04910716 | Suppression of coherent noise in seismic data |
| 04912648 | Expert system inference engine |
| 04914703 | Method for deriving acoustic models for use in speech recognition |
| 04916633 | Expert system apparatus and methods |
| 04933973 | Selective addition of noise to templates employed in automatic speech recognition systems |
| 04942596 | Adaptive enhancement of x-ray images |
| 04953139 | Method for restoring and extrapolating seismic traces |
| 04964103 | Three dimensional before stack depth migration of 2 or 3 dimensional seismic data |
| 04967368 | Expert system with knowledge base having term definition hierarchy |
| 04970658 | Knowledge engineering tool |
| 05003601 | Speech recognition method and apparatus thereof |
| 05043891 | Document generation apparatus and methods |
| 05063522 | Multi-user, artificial intelligent expert system |
| 05093899 | Neural network with normalized learning constant for high-speed stable learning |
| 05095443 | Plural neural network system having a successive approximation learning method |
| 05163076 | X-ray image display apparatus |
| 05191526 | Method for removing coherent noise from seismic data |
| 05195169 | Control device for controlling learning of a neural network |
| 05212767 | Multi-layer network and learning method therefor |
| 05220609 | Method of speech recognition |
| 05222194 | Neural network with modification of neuron weights and reaction coefficient |
| 05239619 | Learning method for a data processing system having a multi-layer neural network |
| 05293574 | Digital x-ray imaging system with automatic tracking |
| 05295227 | Neural network learning system |
| 05309547 | Method of speech recognition |
| 05317675 | Neural network pattern recognition learning method |
| 05355434 | Method and apparatus for performing learning in a neural network |
| 05369727 | Method of speech recognition with correlation of similarities |

FIG. 3D

| Patent No. | Title |
|---|---|
| 04648044 | Basic expert system tool |
| 04970658 | Knowledge engineering tool |
| 04666635 | Domain independent shell for building a diagnostic expert system |
| 05063522 | Multi-user, artificial intelligent expert system |
| 04891766 | Editor for expert system |
| 04912648 | Expert system inference engine |
| 04866634 | Data-driven, functional expert system shell |
| 04916633 | Expert system apparatus and methods |
| 04967368 | Expert system with knowledge base having term definition hierarchy |
| 05043891 | Document generation apparatus and methods |
| 04598369 | Tomography apparatus and method |
| 05163076 | X-ray image display apparatus |
| 04730351 | X-ray diagnostics installation |
| 04813061 | X-ray diagnosis method and apparatus |
| 05293574 | Digital x-ray imaging system with automatic tracking |
| 04727562 | Measurement of scatter in x-ray imaging |
| 04942596 | Adaptive enhancement of x-ray images |
| 04458267 | Digital x-ray system |
| 04573035 | Digital x-ray system |
| 04456926 | Enhancement of fluroscopically generated images |
| 04964103 | Three dimensional before stack depth migration of 2 or 3 dimensional seismic data |
| 04633399 | Method of seismic data enhancement using a phase of rectified trace seismic parameter |
| 04203161 | Method of enhancing common depth point seismic data |
| 04829487 | Method for restoring seismic data using cross-correlation |
| 04860265 | Seismic trace restoration using F-K filtering |
| 04953139 | Method for restoring and extrapolating seismic traces |
| 05191526 | Method for removing coherent noise from seismic data |
| 03652980 | Method and apparatus for seismic signal pattern discrimination |
| 04884248 | Method for restoring seismic data |
| 04910716 | Suppression of coherent noise in seismic data |
| 04914703 | Method for deriving acoustic models for use in speech recognition |
| 05003601 | Speech recognition method and apparatus thereof |
| 04933973 | Selective addition of noise to templates employed in automatic speech recognition systems |
| 04897878 | Noise compensation in speech recognition apparatus |
| 05369727 | Method of speech recognition with correlation of similarities |
| 05220609 | Method of speech recognition |
| 05309547 | Method of speech recognition |
| 04528688 | Continuous speech recognition method |
| 04559604 | Pattern recognition method |
| 04752957 | Apparatus and method for recognizing unknown patterns |
| 05093899 | Neural network with normalized learning constant for high-speed stable learning |
| 05195169 | Control device for controlling learning of a neural network |
| 05095443 | Plural neural network system having a successive approximation learning method |
| 05317675 | Neural network pattern recognition learning method |
| 05295227 | Neural network learning system |
| 04897811 | N-dimensional coulomb neural network which provides cumulative learning |
| 05239619 | Learning method for a data processing system having a multi-layer neural network |
| 05222194 | Neural network with modification of neuron weights and reaction coefficient |
| 05355434 | Method and apparatus for performing learning in a nerual network |
| 05212767 | Multi-layer network and learning method therfor |

FIG. 3E

| word | patents in sorted order |
|---|---|
| absorption | ................XX............................. |
| access | .X..........................................X |
| account | ............X............X..................... |
| accuracy | ............................X........X......... |
| acoustic | ..............................XX................ |
| adding | ...X......................................X.... |
| addition | ...X........................XX.................. |
| additional | ...X........X.................................. |
| adjusted | ............X...........X....................... |
| adjusting | ............XXX................................. |
| algorithm | ....................................X.....X.... |
| amplitudes | ........................XX....................... |
| analysis | .....X..............................X............ |
| analyzed | ....................................X...X........ |
| applied | X.........................................X..... |
| area | ............X......X............................ |
| associated | ....................X.........................X... |
| automatic | ............X.............X...................... |
| automatically | ....X.X........X................................. |
| autoregressive | ..........................XX..................... |
| averaging | ................XX............................... |
| axis | ..................X...............X............ |
| base | XXXXXXXXX.....................................X. |
| beam | ............X..X................................ |
| body | ..................XXX............................ |
| building | XXX............................................ |
| cells | .......................................X.X.... |
| center | ............X......X............................ |
| character | ..........................................X........X..... |
| coding | ..................XX............................ |
| coefficient | ..........X..X................................X... |
| coefficients | ..........................XX..................... |
| coherent | ........................X.X.X..X................. |
| collection | ....................................X.........X |
| compare | ..............................X.........X....... |
| compared | ..............................X........X....X..X.......... |
| compensation | ............X......................X............ |
| compressed | ..................XX............................. |
| computer | X........X....................................... |
| computes | ......X...................................X...... |
| connected | ......................................X..............XX...... |

FIG. 3F

| word | patents in sorted order |
|---|---|
| connecting | .....................X......................X.. |
| connection | ......X..............................XX |
| context | ....XX................................... |
| contrast | ..........X......X........................ |
| control | X............XX...............X.......... |
| controlling | ...................................X..X..... |
| correlation | ..................X.........X............. |
| coupling | ...................................X..X..... |
| depth | ..................X.X..................... |
| derived | ...............XX...X.......X............. |
| deriving | ..................X.......X....XX......... |
| determination | ....................X...................X.. |
| developed | .....X.........X.......................... |
| diagnosis | ................X.X....................... |
| diagnostic | ..X...........X........................... |
| digital | ........X....XX..XX....................... |
| display | ..........XX........XX..................... |
| displayed | ................X..XX..................... |
| displaying | ................X....XX................... |
| distance | .........X..........X...........X..XXX........ |
| distances | .........X...................X....XX.......... |
| domain | ..X...............XXXXX....X............... |
| editor | ....X....X................................ |
| encoded | ....................XX..................... |
| energy | ............X..X........................X.... |
| engine | .X.X.XXX.X................................ |
| error | ..............................X...........X. |
| estimated | ..........................XX.....X........ |
| expert | XXXXXXXXX................................. |
| extracted | ...........X...........................X......... |
| f-k | .........................X.X.............. |
| filter | ..................X........X.....X............ |
| format | ....................XX.................... |
| formed | ........................X.......X......X...X..... |
| fourier | ....................XXXX................. |
| frame | ............X.....................XX............ |
| frames | .......................................XX............ |
| frequency | ........................XX................. |
| generated | ......................X.........X............ |
| generating | ......................X.........X........... |
| generation | X........X................................ |

FIG. 3G

| word | patents in sorted order |
|---|---|
| hierarchical | ..X..........................................X..... |
| hierarchy | ..X....XXX.......................................... |
| image | .........XXXXXXXXX......................X..X... |
| images | ..........XX..XXXXXX................................ |
| imaging | ............XXX..................................... |
| inference | .X.X.XX..X..............................X.......... |
| information | ..XXX...........X............X..X................... |
| intensity | ..............X.XX.................................. |
| interactive | X..X.................X.............................. |
| intervals | ..............X.XX.................................. |
| keyed | .....XX............................................. |
| knowledge | XXXXXXXXXX.................................X.. |
| language | X..X................................................ |
| layer | .......................................XXXXXX |
| layers | .......................................XX.XX.. |
| learn | ....X..................................X....... |
| learning | .......................................XXXXXXXXX |
| level | ............X...XX.................................. |
| levels | ....X.XX............................................ |
| link | ..............................................X.X |
| located | ..............XX.................................... |
| location | ............X..........................X............ |
| logical | ....X..................................X.. |
| mask | ..............XX........................X........... |
| match | ................X............X...................... |
| matrix | ..........................X.X.........X............ |
| measure | ..........................................XX........ |
| memory | ............XX...XX..........................X..... |
| model | ................X....XX...X......................... |
| moved | ..........X..........X............................... |
| multi-layer | ..........................................XX..X |
| multiplied | ............X..........X............................ |
| network | .....XX..................................XXXXXXXXX |
| networks | .........................................X.XX.... |
| neural | .........................................XXXXXXXXX |
| neuron | ..........................................X.....XX.. |
| nodes | ....X..............................................X. |
| noise | ................X.....X...X.XX..XX................... |
| normalized | ...................................X......X......... |
| null | ...............................XX........................ |
| order | X.........X........................................... |

FIG. 3H

| word | patents in sorted order |
|---|---|
| parameter | ........................X.........X......X......... |
| parameters | ......................X.............XX.XXXX.X............ |
| partial | ...........................................XX.....X...... |
| passing | ..............X...X....................................... |
| pattern | ...................................X.........XXXX..XXXXX.. |
| patterns | .....................................XXXXXX.....XXX.. |
| polynomial | ........................XX................ |
| preset | .......................................X.....X........ |
| prestored | .......................................X....XX........ |
| probability | ......X......................................X........... |
| procedure | ..X...................XX.....X.................X.... |
| processed | ...............XXXX.XX..XX.................... |
| processing | .X..............XX..X..................X.....X... |
| processor | .X.........X.............................................X |
| processors | .X........................................................X |
| radiation | .................X.XX....................... |
| radiology | .................XX....................... |
| ratio | .................X............XX.................... |
| real-time | .................XX....................... |
| receiving | ..........................................XX...... |
| recognition | .................................XXXXXXXXX...X...... |
| recognizing | ........................................X....X..X.. |
| reconstruct | ...............................X..X.................. |
| record | .................XX...X.................... |
| records | .................XX....................... |
| reduce | .................XX..............X.................. |
| reduced | ..........X..............................X..... |
| region | ....................X........X................. |
| removed | ....................X........X................. |
| repeated | .................XX....................... |
| retain | ...............................X...X................. |
| rule | XXXX....................................X......X.. |
| rules | XXX.X....................................... |
| sampling | ..........................................XX.................... |
| scanned | ................XX....................... |
| screen | ...XX.X.....X....................................... |
| screens | ....X.X....................................... |
| segments | ...............................X.X................. |
| seismic | ..............................XXXXXXXXX......... |
| selected | .X......................XXXXX......XXXX............ |
| sequence | ........................XX..............X..X............ |

*FIG. 31*

| word | patents in sorted order |
|---|---|
| sequentially | ...........................X.......X.... |
| shell | ..X...XXX................................ |
| shifting | .........X..................X............ |
| signal | ...............XXXX......X...XX.XX.X.XX.. |
| signals | ......................X......XX.....X.X.. |
| space | .............................X.......X... |
| spaced | .........X..................X............ |
| spatial | ..........XX.......X..................... |
| spectral | .............................X.X......... |
| speech | .............................XXXXXXXXX... |
| stored | .......X...XX...............X...........X |
| storing | ..........XX........................X..... |
| structure | ..............................X.....X..... |
| subtracted | .......X.....XX........................... |
| subtracting | ...................X......X.............. |
| subtraction | ........X.X............................... |
| summed | ..........................X...X........... |
| suppression | .............................X...X......... |
| tables | ......X.X................................. |
| temporal | ...............XXX........................ |
| tested | ..................................XX...... |
| threshold | .........X..........................X...X. |
| time | ...X............X....X...X..X....X..X....X... |
| trace | .............................XXXXXXXX..... |
| traces | .............................XXXXXXX....... |
| transform | ..............................XX..XX..... |
| transformed | ..............................X..XXX.X..... |
| two-dimensional | ..........XX..........................X.... |
| vector | ...................................X..X...X...... |
| vectors | .....................................XXX...... |
| video | .........X......X......................... |
| visible | ...........XX............................. |
| voice | ......................................X.X......... |
| weight | .........X..........................XX.....X.X |
| weighting | ..................................X......X..... |
| weights | ..........................................XXX |
| well | .....X..........X......X............X..... |
| word | ....................................XX....... |
| words | ....................................XX.....X.. |
| x-ray | ........XXXXXXXXX.......................... |
| x-t | ..............................X...X....... |
| yield | ...........................XX............. |

FIG. 4

PROCESS AND SYSTEM FOR ARRANGEMENT OF DOCUMENTS

TECHNICAL FIELD OF THE INVENTION

This invention relates in general to the field of electronic systems, and more particularly to a process and system for arrangement of documents.

BACKGROUND OF THE INVENTION

With respect to document repositories holding large numbers of documents, it can be desirable to determine a classification hierarchy or structure of the documents with respect to the content of the documents. A hierarchy or structure can be particularly beneficial where there is no existing knowledge or understanding of such hierarchy or structure prior to its determination. Classification information about a repository of documents can be beneficial with respect to documents comprising text, video, image or audio information or any combination thereof. For example, a collection of U.S. patents may need to be analyzed to determine classification information so the U.S. patents could be broken into sub-classes. Currently, there are no conventional processes or systems that determine the classification hierarchy or structure of a repository of documents where that classification is not artificially imposed.

SUMMARY OF THE INVENTION

In accordance with the present invention, a process and system for arrangement of documents is provided that substantially eliminate or reduce disadvantages and problems associated with prior document processing systems.

According to one embodiment of the present invention, a system for arrangement of documents is provided. The system includes a document repository storing a plurality of documents. An arrangement engine is coupled to the document repository. The arrangement engine is operable to build a plurality of symmetric matrices based upon a plurality of identified arrangements of the plurality of documents in the document repository. Each matrix is structured such that each row and each column is associated with a document. The arrangement engine is also operable: to fill each cell of each symmetric matrix with a relevance value representing a relevance between a document associated with the row of the cell and a document associated with the column of the cell, to generate a fitness value for each matrix based upon a magnitude and a position of each relevance value by analyzing each symmetric matrix using a fitness function, to identify an optimal arrangement of the plurality of documents based upon the fitness value of each matrix, and to provide the optimal arrangement of documents to a user of the system.

A technical advantage of the present invention is the automatic determination of an optimal arrangement of documents in a repository which reveals the classification hierarchy or structure of the repository of documents. The optimal arrangement is that determined to be better than other examined arrangements given the constraints of the system. The classification information provides knowledge of the relationships between the content of the documents when the repository of documents is viewed collectively. According to the present invention, there is no imposition of a number of subclasses into which the repository of documents is to be divided. The present invention allows determination of classification information with no artificially imposed limits and in the absence of knowledge of the result.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIGS. 3A–3I illustrate an embodiment of a matrix of documents and an optimal arrangement of those documents according to the teachings of the present invention.

DETAILED DESCRIPTION OF THE INVENTION

Overview of System

Figures 1, 2A:
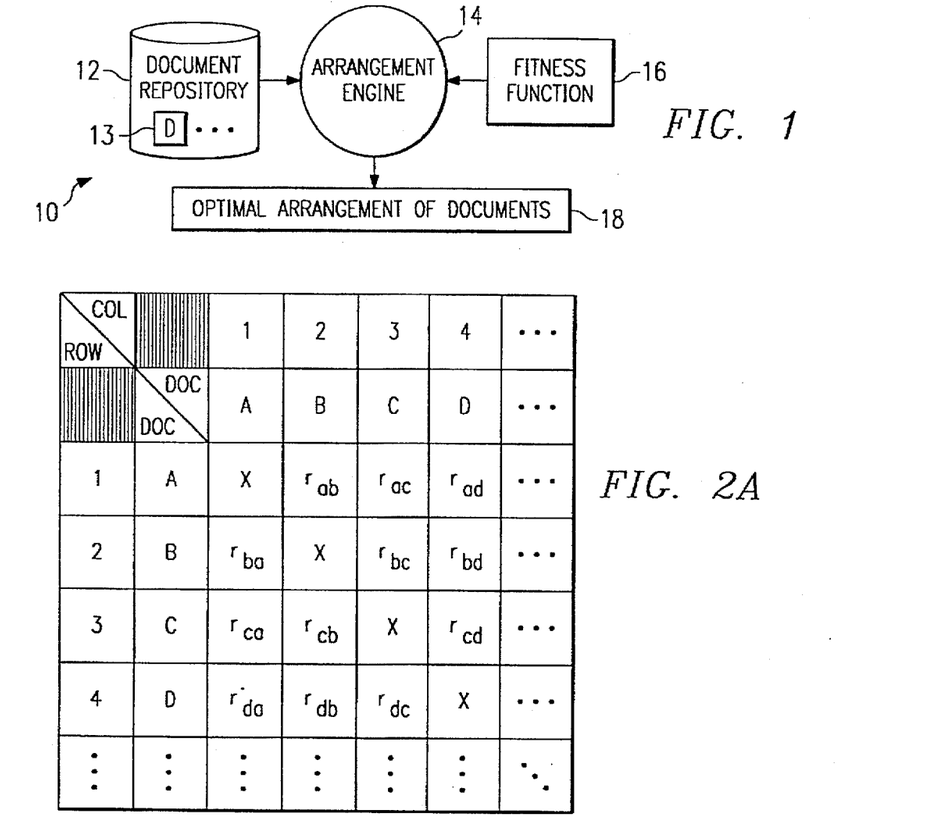
FIG. 1 is a block diagram of one embodiment of a system for arrangement of documents constructed according to the teachings of the present invention.
FIGS. 2A and 2B illustrate one embodiment of a matrix and arrangement of documents in that matrix according to the teachings of the present invention.

FIG. 1 is a block diagram of a system, indicated generally at 10, for optimal arrangement of one embodiment of documents constructed according to the teachings of the present invention. System 10 comprises a document repository 12. Document repository 12 comprises a plurality of documents 13. For each pair of documents 13 in document repository 12, there is a relevance factor representing the relevance between those two documents. Such relevance factors can be generated according to a number of processes. One such process is described in detail in U.S. patent application Ser. No. 08/523,233, filed Sep. 5, 1995, also assigned to Electronic Data Systems, and entitled "System and Process for Determining Relevance Between Two Documents."

System 10 comprises an arrangement engine 14 which is coupled to document repository 12. System 10 further comprises a fitness function 16 which is provided to arrangement engine 14. Arrangement engine 14 arranges the relevance factors for documents 13 in document repository 12 in a matrix. Arrangement engine 14 then processes the matrix using fitness function 16 to determine an optimal arrangement. Arrangement engine 14 then produces an optimal arrangement 18 that comprises an optimal arrangement of documents 13.

In operation, arrangement engine 14 can generate for each possible arrangement of documents 13 a fitness value based upon fitness function 16. The arrangement of documents 13 identified by arrangement engine 14 to be better than other examined arrangements given the constraints of system 10 is provided as optimal arrangement 18. It should be understood that as used herein "optimal" refers to a solution determined to be better than other examined arrangements within the constraints of the system such as time or processing power. Better arrangements highlight the classification hierarchy or structure of document repository 12 by placing relevant documents near one another. Arrangement engine 14 can operate to analyze each possible permutation of documents 13 in the matrix. As one alternative, arrangement engine 14 can operate to use numerical techniques to reduce the size of the analysis for large matrices. One embodiment of a matrix of documents and an optimal arrangement 18 is shown and described in more detail with respect to FIGS. 2A, 2B, and 3A–3I.

System 10 can be implemented within a computer system or as dedicated hardware. Within a computer system embodiment, document repository 12 may reside on a magnetic storage device. Arrangement engine 14 may be a process executed by a processor. Fitness function 16 and optimal arrangement 18 may comprise data stored in a memory device. In this computer system embodiment, the processor operates under control of software to execute a process of creating a matrix and generating a fitness value in order to determine an optimal arrangement. In a dedicated hardware embodiment, the functionality can be implemented directly in hardware rather than comprising software executed by a general purpose computer processor.

Matrix of Relevance Factors

Figure 2B:
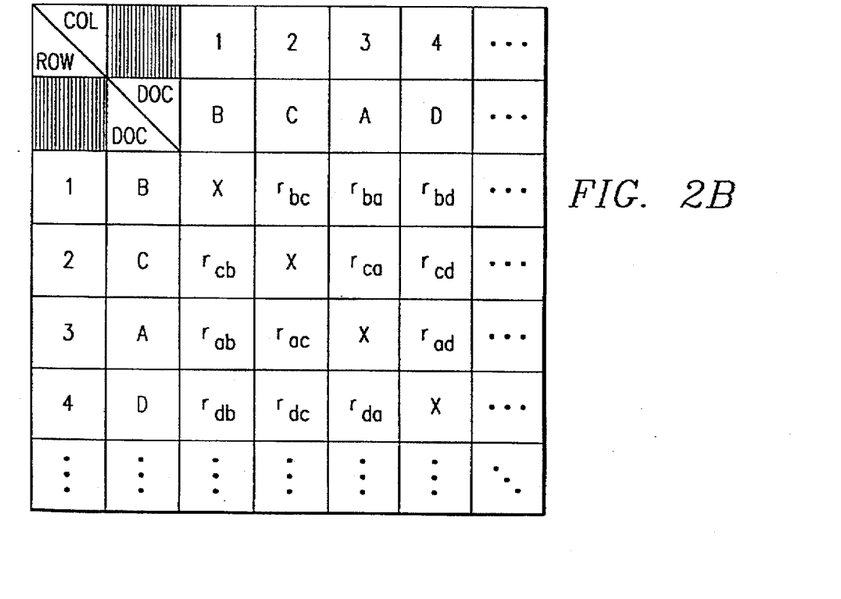

FIGS. 2A and 2B illustrate one embodiment of a matrix of relevance factors for each document 13 in document repository 12 and arrangement of those documents 13 according to the teachings of the present invention. As shown in FIG. 2A, a matrix is constructed that comprises a plurality of columns and a plurality of rows. The matrix is a symmetric matrix wherein each column and each row is associated with one of the documents 13 in document repository 12. The number of columns, therefore, is equal to the number of rows.

In the matrix of FIG. 2A, the rows and columns are numbered "1, 2, 3, 4. . . ," and the letters "A, B, C, D . . ." each represent a document 13 in document repository 12. The entries in the matrix, "$r_{ab}$," for example, represent the relevance between the document in the respective row and the document in the respective column. Thus, for example, "$r_{ab}$" represents the relevance of document A to document B. As mentioned above, relevance factors representing the relevance between two documents can be generated according to various processes. One such process is disclosed in U.S. patent application Ser. No. 08/523,233, which has been referenced above.

According to the teachings of the present invention, the documents are placed in the same order from column 1 to the last column as they are ordered from row 1 to the last row. As a result, the diagonal of the matrix represents each document's relevance to itself and is marked with "X". In this embodiment, these diagonal values do not affect the arrangement of the documents.

FIG. 2B illustrates arrangement of the documents in the matrix of FIG. 2A according to the teachings of the present invention. As shown, the order of the documents in the columns and rows has changed from that of FIG. 2A. The change of arrangement also changes the entries in the matrix. The arrangements of FIGS. 2A and 2B can be analyzed according to the present invention to determine which provides a better arrangement of the documents according to the fitness function 16. Better arrangements highlight the classification hierarchy or structure of document repository 12.

For example, assume document repository 12 comprises a collection of n documents. According to the present invention, arrangement engine 14 addresses the problem of determining an optimal arrangement or permutation of these n documents putting relevant documents near each other. Such an optimal arrangement would be an appropriate shelf order for the documents in an electronic document repository. Arrangement engine 14 then provides this result as optimal arrangement 18. By placing relevant documents near each other, the optimal arrangement provides classification information about the document repository. The determination of classification information can be clearly understood by reference to FIGS. 3A–3I discussed below.

As an example optimization, let I be an arbitrary arrangement of the row and column indices $\{1, \ldots, n\}$. Let $R_I = (r_{ij})$, $i, j \in I$, be a numerical (real-valued) relevance matrix, where $r_{ij}$ is a measure of the relevance between documents i and j. It should be understood that FIGS. 2A and 2B illustrate a matrix constructed in this manner. The relevance measure $r_{ij}$ could be the log-likelihood ratio for contrasting the hypothesis that documents i and j are relevant to each other versus the hypothesis that they are not relevant to each other as described in U.S. patent application Ser. No. 08/523,233, which has been referenced above.

Fitness function 16 can be represented by $f(R_I)$ and comprises a fitness function defined on relevance matrices $R_I$. For example, given some pre-determined cutoff constant c, and defining $Ji=\{j>i:r_{ij}>c\}$, then the fitness function could be defined as follows:

$$f(R_I) = \sum_{i \in I} \sum_{j \in J_i} |j - i|.$$

This embodiment of the fitness function comprises an unweighted fitness function which penalizes arrangements that place related documents farther away from each other. According to the teachings of the present invention, the fitness function $f(R_I)$ measures the fitness of the repository when the documents are ordered in the arrangement determined by the permutation I.

Arrangement engine 14 operates to determine the permutation or arrangement I that optimizes $f(R_I)$. For example, $f(R_I)$ might be analyzed as the energy function in a simulated annealing process that finds improved permutations I. Once an optimal arrangement is determined, it is provided as optimal arrangement 18. It should be understood that, in the optimal arrangement, the order of documents in the rows of the matrix provide an ordering that places documents related to one another near one another.

Example Arrangement of Documents

FIGS. 3A–3I illustrate one embodiment of a matrix of documents and an optimal arrangement of those documents according to the teachings of the present invention. In the embodiment of FIGS. 3A–3I, the documents constitute U.S. patents having the patent numbers shown as each row heading in FIGS. 3A and 3B. The columns of the matrices of FIGS. 3A and 3B have the same order as the rows, but the patent numbers are omitted as unnecessary FIG. 3A comprises a symmetric matrix with the patent documents ordered randomly. As can be seen, the documents are ordered by patent number which is essentially random with respect to the content of and the relevance between the documents. As discussed above, the "X"s represent the diagonal. For display purposes, the integers (2–9) are used as plotting characters to represent how relevant the documents corresponding to that row and column are to one another (9 being the most relevant). The integer values are quantized representations of the relevance factors between each pair of documents. Values represented by a "." comprise values lower than a cut-off constant "c".

Figure 3B:
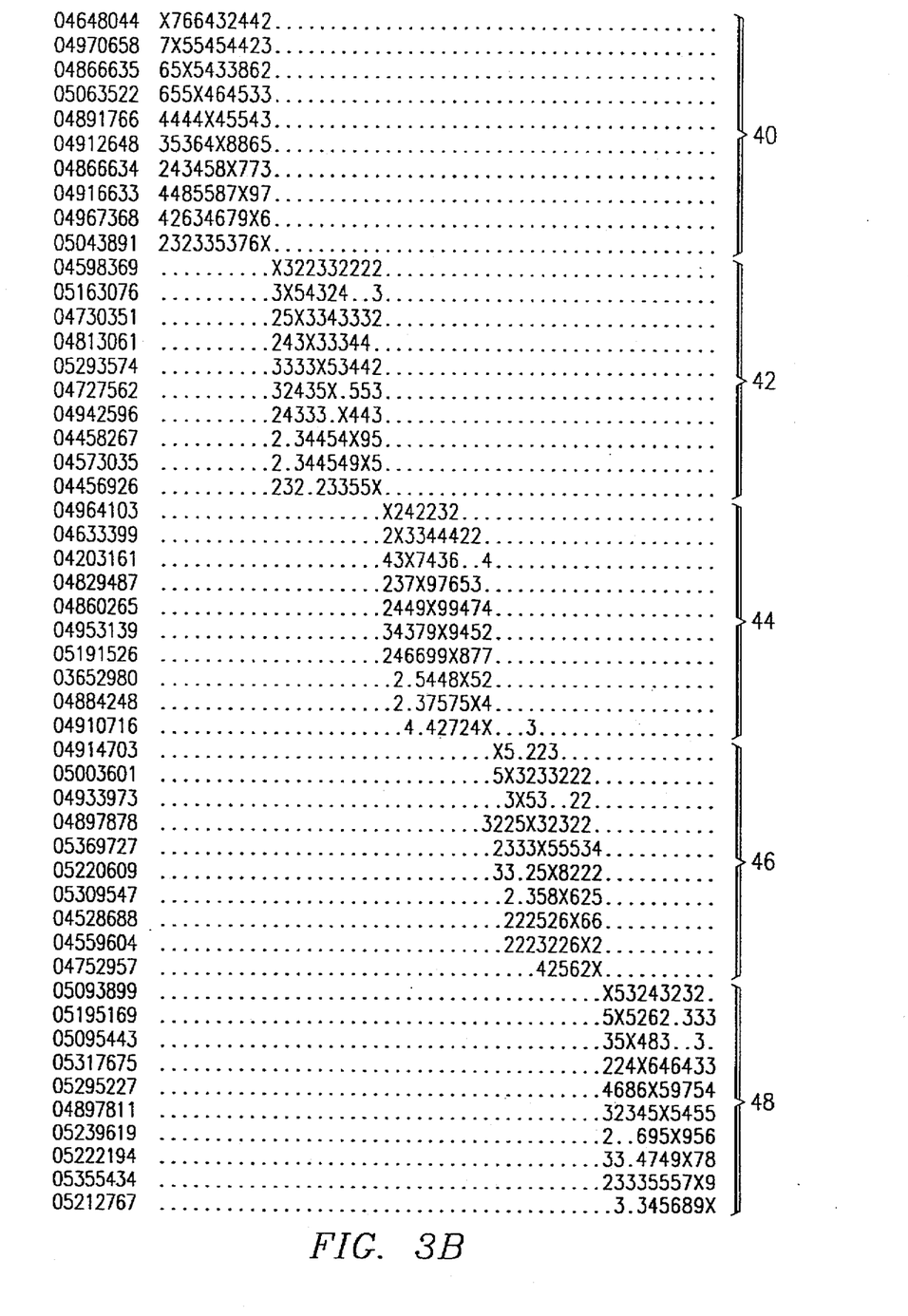
Figure 3E:
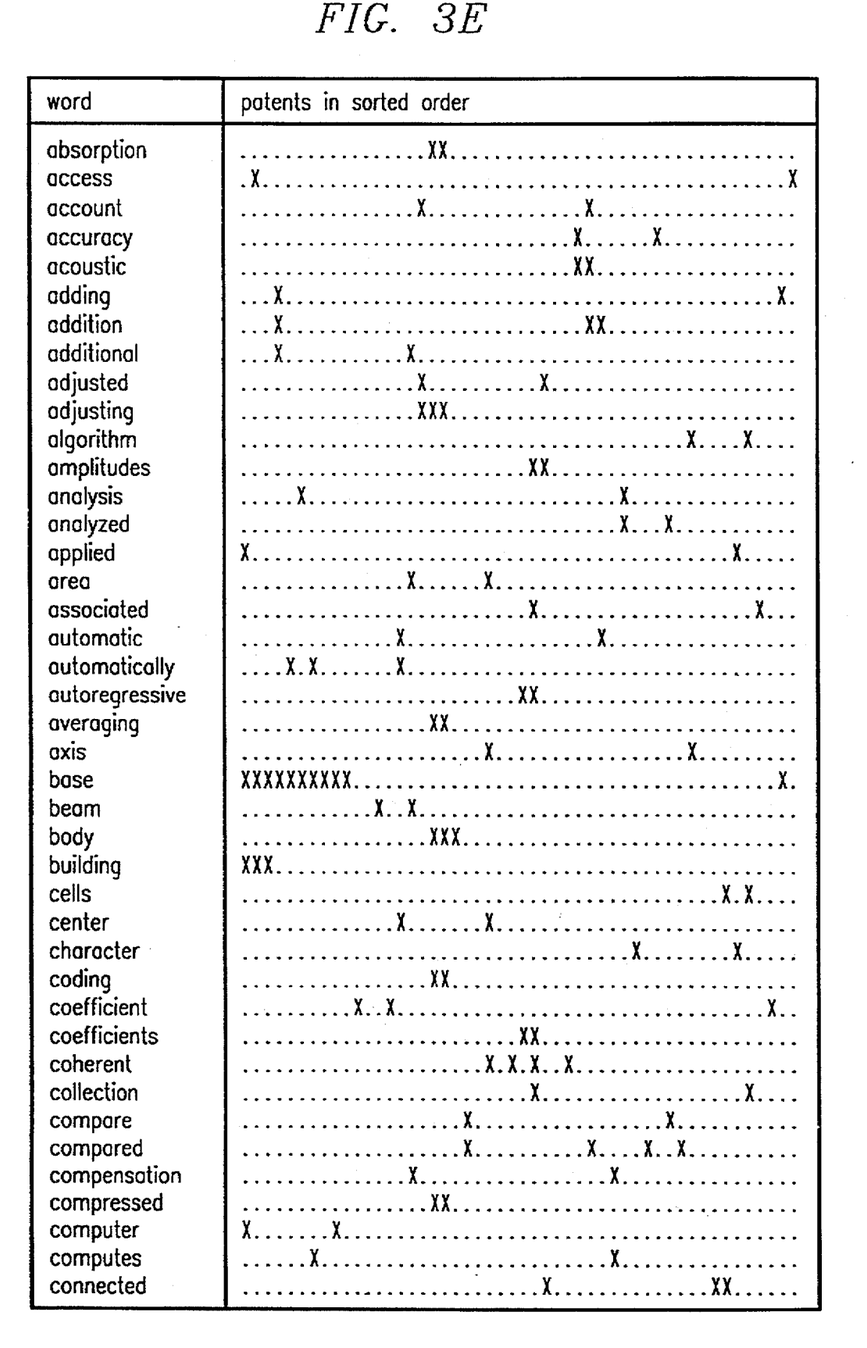
Figure 3F:
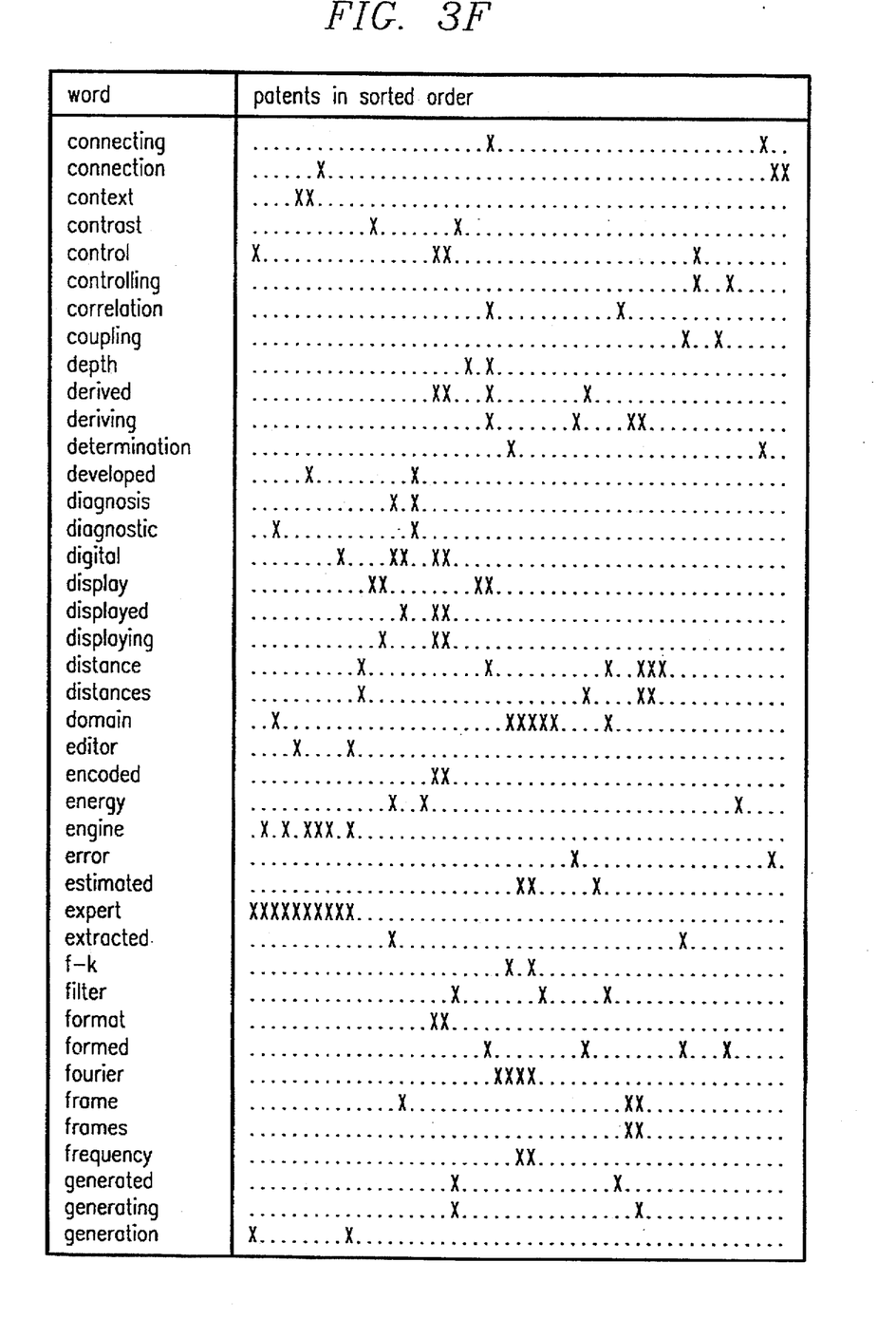

According to the present invention, the entries in the matrix of FIG. 3A and the matrix of FIG. 3B correspond to the relevance between each patent and each other patent. This relevance between each pair of patents can be determined according to numerous methods. One such method that is particularly beneficial is described in detail in U.S.

patent application Ser. No. 08/523,233, which has been referenced above.

As can be seen in FIG. 3A, the arrangement of the patents in consecutive order provides no particular information as to the classification hierarchy or structure of the collection of documents. Even a cursory knowledge of the U.S. Patent system would lead one to expect such a result from arranging the patents in consecutive order. The present invention provides a process and system for creating an optimal arrangement of the patent documents which provides a determination of the classification hierarchy and structure of the set without prior knowledge or imposition of an arbitrary structure.

FIG. 3B illustrates an optimal arrangement, generated according to the teachings of the present invention, of the documents in this embodiment. FIG. 3B is an optimal arrangement of the matrix where the rows and columns have been reordered to minimize the fitness function $$f(R_I) = \sum_{i \in I} \sum_{j \in J_i} r_{ij}|j - i|$$

This function, although similar to that described above, also includes weighting according to the relevance factor $r_{ij}$ and comprises a weighted fitness function.

As can be seen, the order of the patents has changed considerably, and the patents now fall clearly into five distinct sub-classes (40, 42, 44, 46, and 48). The patents in each sub-class have content that is relevant to one another. The arrangement of these documents shown in FIG. 3B is beneficial in that it can allow the indexing or classification of the patent documents into these five subgroups. According to the present invention, this classification hierarchy or structure can be generated despite lacking prior knowledge of the number of sub-classes of which the set of patents is comprised.

FIGS. 3C and 3D illustrate the titles of the U.S. patents as arranged with respect to FIGS. 3A and 3B, respectively. FIG. 3C shows the U.S. patents in order by patent number as in FIG. 3A. As can be seen from FIG. 3C, the titles of adjacent documents are not relevant to one another. The documents are, for practical purposes, arranged randomly with respect to their content.

FIG. 3D illustrates the U.S. patents arranged according to the optimal arrangement of FIG. 3B. As can be seen from FIG. 3D, the documents are arranged such that adjacent documents are related to one another. For example, it can be seen that patent documents that relate to neural networks are grouped together at the bottom part of the arrangement. It should be understood from FIG. 3B and FIG. 3D that the sub-classes of documents can be identified both with respect to which documents are in the sub-class and with respect to what topic the sub-class represents. For example, the fifth sub-class 48 of FIG. 3B includes U.S. Pat. No. 5,093,899 to U.S. Pat. No. 5,212,767 and could be described as covering the topic of "neural networks".

Figure 3G:
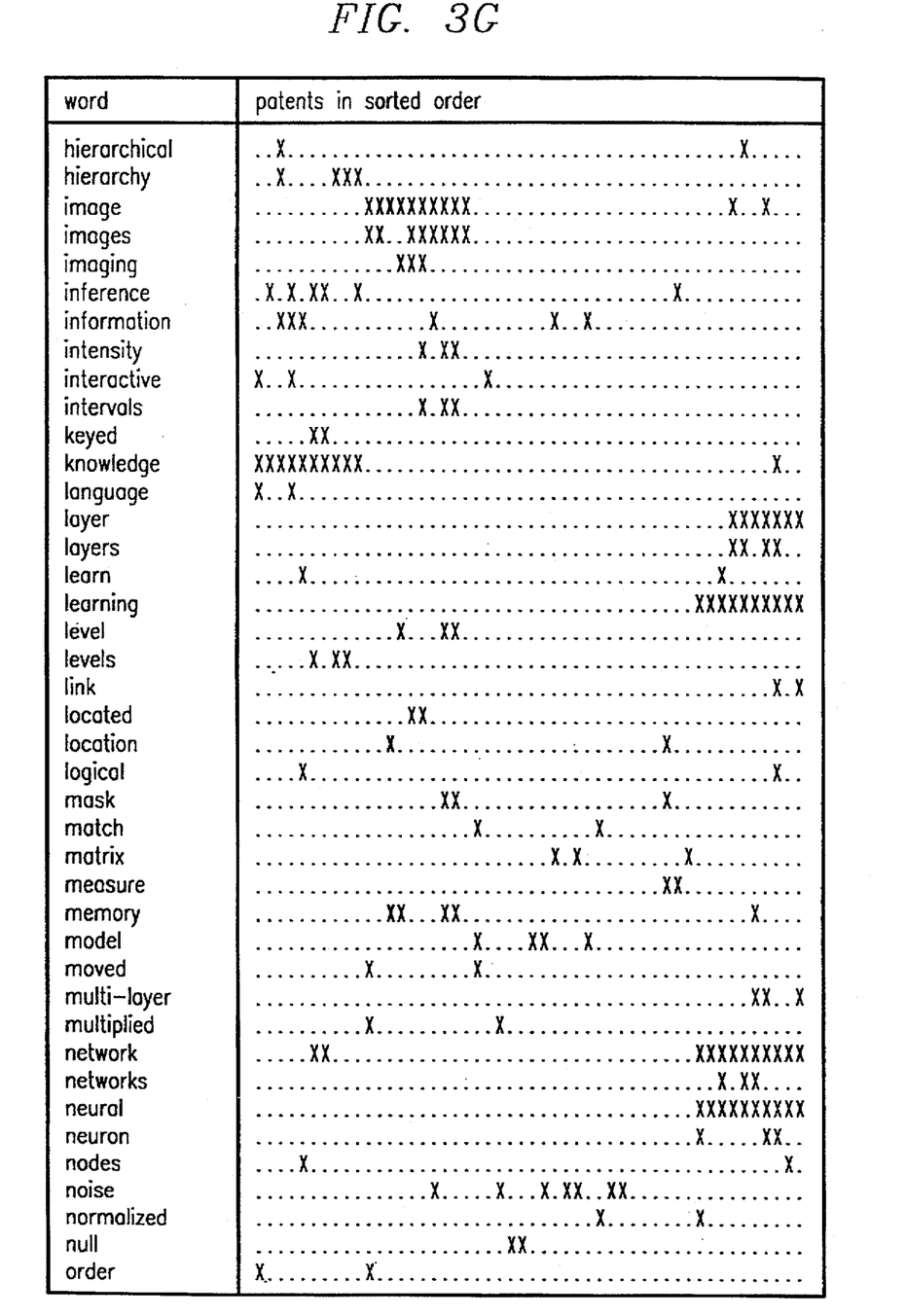
Figure 3H:
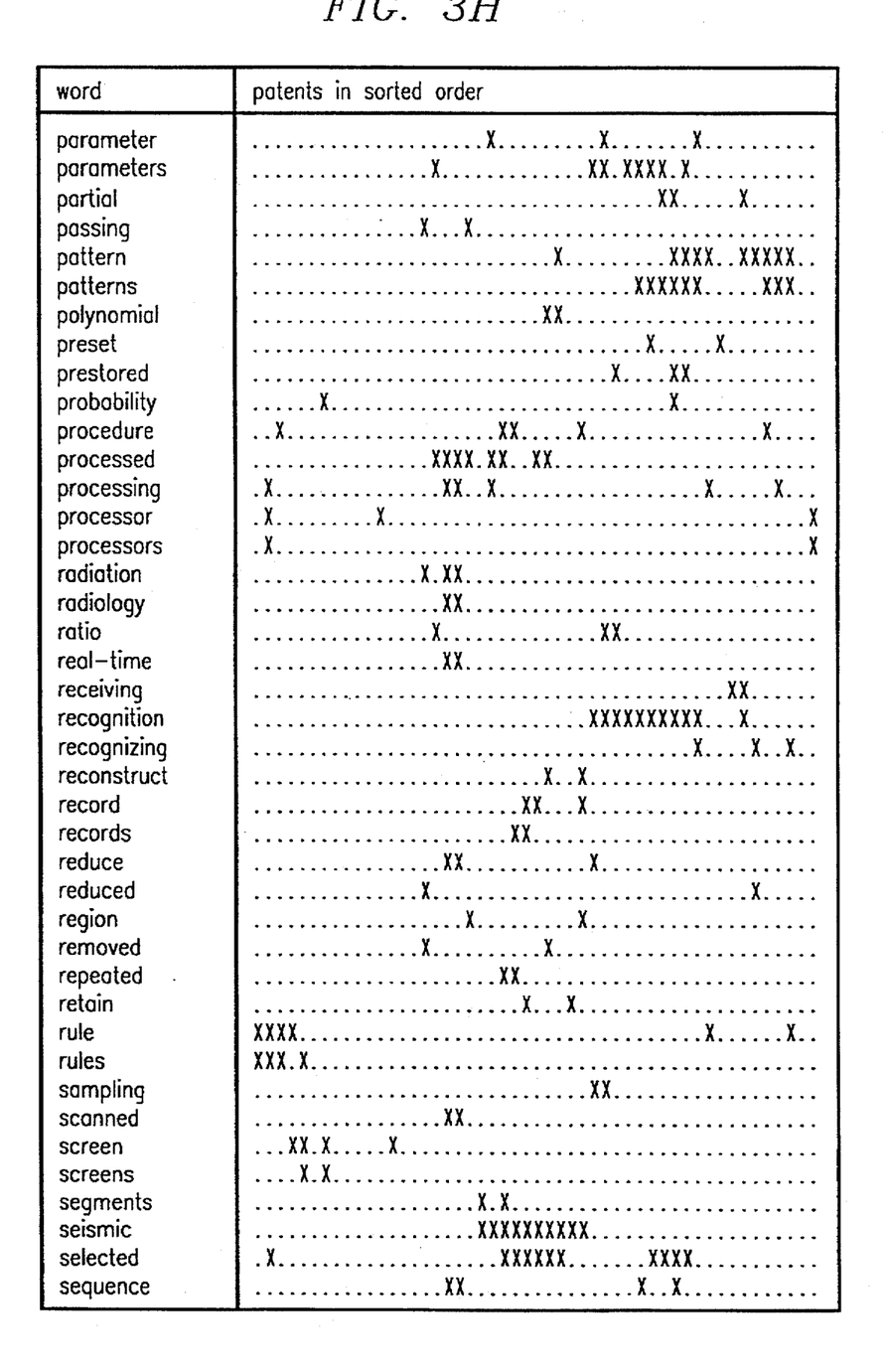
Figure 3I:
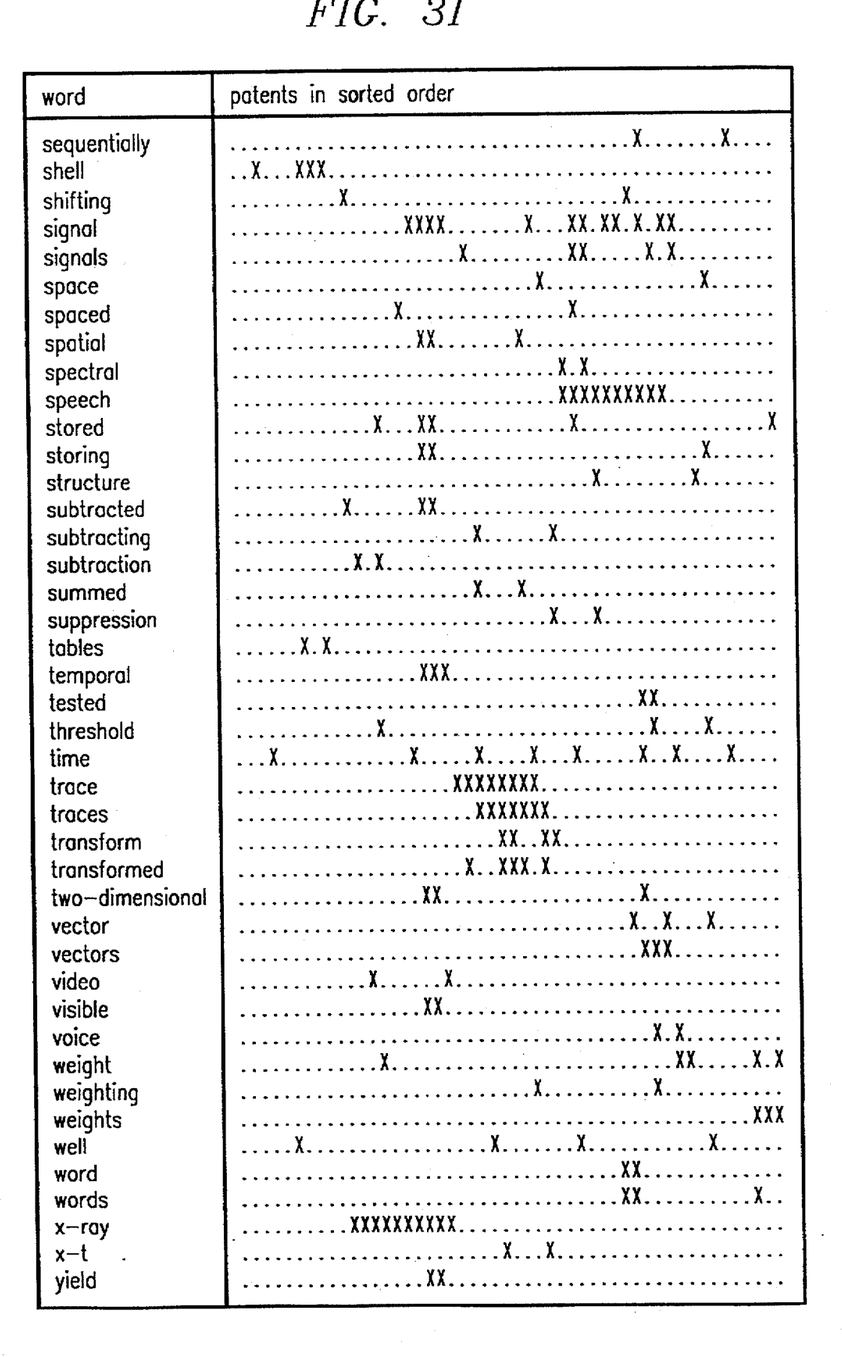

FIGS. 3E, 3F, 3G, 3H and 3I illustrate words that are present in the patent documents. In each of these five FIGUREs, each row is associated with one word. Whether or not that word is present in each of the documents is shown by the entries in the columns to the right of the word. The "." and "X" entries are placed in the same order as the arrangement of FIG. 3B. Each "." represents a word not being present in the associated document. Conversely, each "X" represents a word that is present in the associated document. As can be seen, the optimal arrangement places many of the words into groups such that documents that contain that word are adjacent. For example, FIG. 3G shows that the word "neural" and the word "network" appear in adjacent documents. It should be understood that prior to arrangement according to the teachings of the present invention, the words would be randomly distributed such that similar charts would not show such groupings of the words. FIGS. 3E–3I should make clear the effect of the present invention in placing relevant documents adjacent to one another based upon important shared content.

Flow Chart of Process

Figure 4:
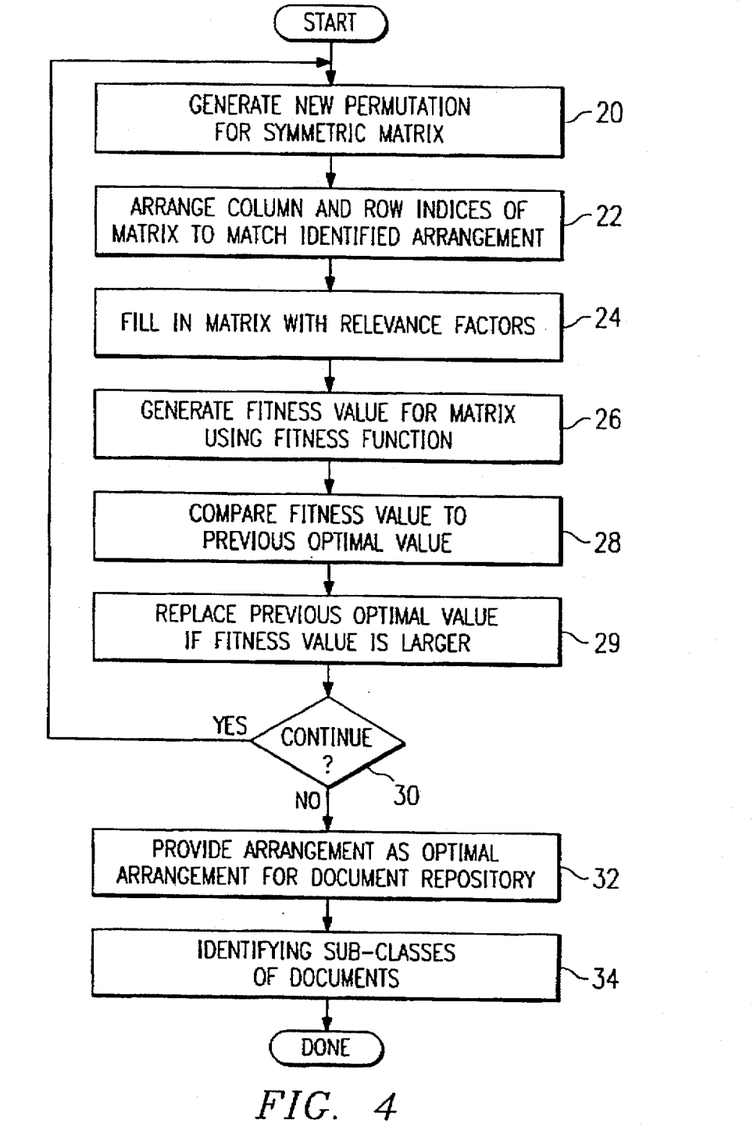
FIG. 4 is a flow chart of one embodiment of a process for arrangement of documents and identifying sub-classes according to the teachings of the present invention.

FIG. 4 is a flow chart of one embodiment of a process for optimal arrangement of documents according to the teachings of the present invention. In step 20, a new permutation for arrangement of the symmetric matrix is generated. The first time step 20 is performed, the arrangement can match the existing order of documents in the document repository. After the arrangement permutation has been generated, the column and row indices of the matrix are arranged in step 22 to match the identified arrangement. Then, in step 24, the matrix is filled with the appropriate relevance factors—each matrix cell holds the relevance factor representing the relevance between the two associated documents. In FIGS. 3A and 3B, the relevance factor is represented as a quantized integer based upon the magnitude of the log-likelihood ratio.

In step 26, a fitness value is generated for the matrix using the fitness function. In one embodiment of the present invention, the fitness function rewards arrangements in which more relevant documents are positioned near each other. In step 28, the fitness value is analyzed to determine whether the arrangement is the best presently identified. In one embodiment of the present invention, this comprises comparing the fitness value to fitness values for previously examined arrangements. In step 29, the value previously stored as the optimal value is replaced with the current fitness value if the current value is higher. In this case, the current permutation becomes the best presently defined.

In step 30, the process checks whether to continue analyzing arrangements. This continuation decision can be based upon a specified termination condition, for example, a time constraint met, a maximum number of iterations reached, all permutations analyzed, or other appropriate termination condition. If the termination condition is not satisfied, then the process continues by returning to step 20. If the termination condition is satisfied, then in step 32, the permutation that has been identified as the best of the examined permutations is provided as an optimal arrangement for the document repository. In step 34, the sub-classes of the document repository are identified from the optimal arrangement. This sub-class identification can be accomplished automatically or manually by inspection of the optimal arrangment.

Although the present invention has been described in detail, it should be understood that various changes, substitutions and alterations can be made hereto without departing from the spirit and scope of the invention as defined by the appended claims.

What is claimed is:

1. A system for arrangement of documents, comprising:
   a document repository storing a plurality of documents; and
   an arrangement engine coupled to the document repository, the arrangement engine operable to:
   build a plurality of symmetric matrices based upon a plurality of identified arrangements of the plurality of documents in the document repository, each symmetric matrix structured such that each row and corresponding column are associated with a particular document;

fill each cell of each symmetric matrix with a relevance value representing a relevance between a document associated with the row of the cell and a document associated with the column of the cell;

generate a fitness value for each symmetric matrix based upon a magnitude and a position of each relevance value by analyzing each symmetric matrix using a fitness function;

identify an optimal arrangement of the plurality of documents based upon the fitness value of each symmetric matrix; and provide an optimal arrangement of documents as system output.

2. The system of claim 1, wherein the system is implemented on a computer system having a storage device, a memory and a processor.

3. The system of claim 1, wherein each relevance value is based upon a relevance measure between two documents based upon a log-likelihood ratio contrasting the hypothesis that the two documents are relevant to each other versus the hypothesis that the two documents are not relevant to each other.

4. The system of claim 3, wherein the fitness function used to generate a fitness value comprises a weighted fitness function.

5. The system of claim 1, wherein each document comprises text information.

6. A process for arrangement of documents, comprising:

building a plurality of symmetric matrices based upon a plurality of identified arrangements of a plurality of documents in a document repository, each symmetric matrix structured such that each row and corresponding column are associated with a particular document;

filling each cell of each symmetric matrix with a relevance value representing a relevance between a document associated with the row of the cell and a document associated with the column of the cell;

generating a fitness value for each symmetric matrix based upon a magnitude and a position of each relevance value by analyzing each symmetric matrix using a fitness function;

identifying an optimal arrangement of the plurality of documents based upon the fitness value of each symmetric matrix; and providing the optimal arrangement of documents as process output.

7. The process of claim 6, wherein the process is implemented on a computer system having a magnetic storage device, a memory and a processor.

8. The process of claim 6, wherein filling each cell comprises filling each cell with a relevance value based upon a relevance measure between the two documents based upon a log-likelihood ratio contrasting the hypothesis that two documents are relevant to each other versus the hypothesis that the two documents are not relevant to each other.

9. The process of claim 6, wherein generating a fitness value comprises generating a fitness value using a fitness function comprising a weighted fitness function.

10. The process of claim 6, wherein building comprises building with respect to documents comprising text information.

11. A process for arrangement of documents and identification of sub-classes of documents, comprising:

building a plurality of symmetric matrices based upon a plurality of identified arrangements of a plurality of documents in a document repository, each symmetric matrix structured such that each row and corresponding column are associated with a particular document;

filling each cell of each symmetric matrix with a relevance value representing a relevance between a document associated with the row of the cell and a document associated with the column of the cell;

generating a fitness value for each symmetric matrix based upon a magnitude and a position of each relevance value by analyzing each symmetric matrix using a fitness function;

identifying an optimal arrangement of the plurality of documents based upon the fitness value of each symmetric matrix; and identifying a plurality of sub-classes of documents from the optimal arrangement of documents.

12. The process of claim 11, wherein the process is implemented on a computer system having a magnetic storage device, a memory and a processor.

13. The process of claim 11, wherein filling each cell comprises filling each cell with a relevance value based upon a relevance measure between two documents based upon a log-likelihood ratio contrasting the hypothesis that the two documents are relevant to each other versus the hypothesis that the two documents are not relevant to each other.

14. The process of claim 11, wherein building comprises building with respect to documents comprising text information.

15. The process of claim 11, wherein generating a fitness value comprises generating a fitness value using a fitness function comprising a weighted fitness function.

* * * * *